(12) United States Patent
Dob

(10) Patent No.: US 6,586,024 B1
(45) Date of Patent: Jul. 1, 2003

(54) METHOD OF PRODUCING SHELF-STABLE, UNBAKED BREAD PRODUCTS

(76) Inventor: Janet Dob, 732 Merion Greene, Charlottesville, VA (US) 22901

( * ) Notice: Subject to any disclaimer, the term of this patent is extended or adjusted under 35 U.S.C. 154(b) by 0 days.

(21) Appl. No.: 09/318,856

(22) Filed: May 26, 1999

Related U.S. Application Data

(60) Provisional application No. 60/086,648, filed on May 26, 1998.

(51) Int. Cl.[7] ................................................. A21D 8/02
(52) U.S. Cl. ....................................................... 426/19
(58) Field of Search ........................ 426/19, 275, 549, 426/446

(56) References Cited

U.S. PATENT DOCUMENTS

| | | | | |
|---|---|---|---|---|
| 3,802,824 A | * | 4/1974 | Amster et al. ............... | 425/371 |
| 4,357,356 A | * | 11/1982 | Joulin ........................ | 426/19 |
| 4,657,769 A | * | 4/1987 | Petrofsky .................... | 426/659 |
| 5,346,715 A | * | 9/1994 | Fertel ......................... | 426/524 |
| 5,409,717 A | * | 4/1995 | Apicella et al. .............. | 426/19 |
| 5,472,724 A | | 12/1995 | Williams et al. ............. | 426/497 |
| 5,641,527 A | * | 6/1997 | Burger ........................ | 426/94 |

OTHER PUBLICATIONS

Matz., Modern Baking Technology, Scientific American., v 251, p. 123–131, Nov. 1984.*
Reynolds., Boiled and Frozen, Bagels Go Global., Bakery Production and Marketing., v28, n1, p. 106–111, Jan. 1993.*
Kroskey., Take The Plunge., Bakery Production and Marketing., v31, n11, p. 52–58, Aug. 1996.*
Gist Brocades., Bagel Production., Milling and Baking News., v73, n39, p. 17–19, Nov. 1994.*
Rombauer., The Joy of Cooking., p. 617–618, Dec. 1975.*
Structure of Starch in Food: Interaction of Starch and Sugars with Other Food Components, P. Wrsch pp. 35–48.
Principals of Cereal Science and Technology, R. Carl Hoseney, 1986 pp. 33–38.
Practical Baking, Sultan, W. J., 1965. AVI Publishing Co., Inc. Westport, CT, pp. 126–130.

* cited by examiner

Primary Examiner—Arthur L. Corbin
(74) Attorney, Agent, or Firm—Sheldon H. Parker

(57) ABSTRACT

A method of preparing bread products, such as bagels, to increase shelf-stability is disclosed. Once the dough has been formed into a bagels, a second floor time of about 15 to 40 minutes is provided, sufficient to fully activate all yeast activity within the dough. During the second floor time the dough can be placed in a proof box, at temperature in the range of about 85° to about 100° and a relative humidity of 30–50%. The dough is sealed by exposing both sides to boiling water, having a temperature 180° F.–212° F., and then fully cooked within the water. This produces a product that is shelf-stable. Prior to consumption, the product, e.g. bagels are browned in a hot oven. Freezing gives the bagels a shelf life of up to about 9 months, air tight packaging a shelf life of up to about 10 days and gas flush packaging has a shelf life of about 45 days. Once the bagels are baked, they remain fresh for up to 48 hours.

16 Claims, 2 Drawing Sheets

METHOD OF PRODUCING SHELF-STABLE, UNBAKED BREAD PRODUCTS

This application claims the benefit of Provisional application Ser. No. 60/086,648 filed May 26, 1998.

BACKGROUND OF THE INVENTION

1. Field of the Invention

The disclosed process produces an unfrozen, ready-to-bake bagel that is shelf-stable and remains "fresh" for up to ten (10) days prior to baking and up to 48 hours subsequent to baking.

2. Brief Description of the Prior Art

Bread products are an important food for proper nutrition and a dietary staple throughout the world. The process of making bread products is, however, lengthy. The preparation of bread or pastry, in which yeast is used as a proofing agent, requires multiple steps. First, the dough ingredients are mixed and kneaded. Next, the dough is pre-proofed, or bulk fermented, and pre-shaping takes place. The product then undergoes the intermediate proofing step and the definitive shaping takes place. Finally, the final proofing and, when the product is fully raised, the dough is baked. This process can take as long as six to eight hours, which requires the process to he completed during the night for bread products being sold in the early morning.

One of the more popular bread products is the bagel with consumer demand having increased dramatically over the past few years. Bagels, however, are not made like standard bread products and require a skill and equipment not readily available to most bakeries. This scarcity of skill and equipment further complicates meeting the consumer demand. In order to provide supermarkets and bakeries With fresh bagels, various processes have been developed to meet consumer needs.

The most popular of the processes has been to freeze the new dough, or partially cooked bagel. This freezing process is done immediately after par cooking and the product remains frozen until consumer defrosting. This, however, has created problems of consistency, temperature variations in distribution and storage, adversely altering the quality. Once reheated, these frozen bagel harden within several hours.

Current bagel technology includes Petrofsky's U.S. Pat. No. 4 657,769. This bagel process makes an unbaked bagel that is passed through boiling water to establish the traditional bagel crust without thoroughly cooking the dough. The bagel is then frozen in its semi-raw dough form, without completion of the yeast activity. Problems associated with this process include:

1) at the bakery site, the frozen bagels need to be thawed and proofed prior to being baked in a commercial oven;
2) because the yeast needs to be revived, inconsistencies occur during the baking cycle in that the holes within the dough close up when yeast causes the bagels to rise too much and when the bagels do not rise enough the bagels are tough;
3) the baked bagels lose freshness after only 4 to 6 hours;
4) again, because the yeast activity is not completed prior to freezing, low temperatures must be maintained during distribution and storage to ensure that the yeast does not awaken from dormancy at these stages in the life of the unbaked product; and
5) the time and labor required to bring the frozen, unbaked bagel product to the consumer is extensive.

A second bagel technology is the par-baked product, such as Arnie's Bagelicous (a Quaker Company) and others. These companies produce a partially baked bagel that is made in the traditional fashion with either steam or boiling used as the method to establish the traditional bagel crust. The yeast activity is completed during a shortened baking cycle that continues only for the length of time necessary to complete the activity of the yeast, and is stopped before the crust completely browns. This product is then frozen, packaged, and readied for distribution and storage. At the bake-off site, the product is baked again in a very hot oven and served to the consumer. This procedure results in the loss of a great deal of moisture. Drying occurs in the first baking cycle again in the freezing cycle, and then again during the second baking cycle. The resulting product is a very dry, thick-crusted bagel with an even shorter baked shelf-life than the Petrofsky's method.

Another existing bagel method is the manufacture bake, and freeze process, commonly referred to as bake and serve product. This process yields a fully baked, frozen bagel, made in the traditional fashion by either steam or boiling to establish the crust. The product is sometimes dried then baked with the yeast activity completed during a full baking cycle. The product is then frozen and shipped. Problems in this process include:

1) the texture of the product becomes rubbery and the crust becomes soggy once thawed;
2) unfrozen packaged baked bagels go through a crust softening state from the plastic packaging. The disclosed process solves the problems that exist in the bagel manufacturing industry by producing a ready-to-bake bagel that is shelf-stable even though it is unbaked and unfrozen.

SUMMARY OF THE INVENTION

A method of preparing bread products, such as bagels, is disclosed that dramatically increases shelf-stability for distribution. The ingredients are mixed to form a dough that is then given a first floor time in the range of about 10–20 minutes. The dough is then formed into bagels and a second floor time of about 15 to 40 minutes is provided. The second floor time must be sufficient to complete all yeast activity Within the dough. During the second floor time the dough can be placed in a proof box, at temperature in the range of about 85° to about 100° and a relative humidity of 30–50%.

The bagel dough is sealed by exposing both sides to boiling water between 180° F.–212° F., and then fully cooking the bagel within the water. To fully cook a bagel takes a minimum of about 1½ minutes to maximum of 2½ minutes per one (1) ounce of bagel dough. A typical bagel weighs between 3½ and 4½ ounces, resulting in a cooking time of 6 to 11½ minutes, ±0.15 minutes. This step yields a product where the yeast activity is completed during the boiling cycle, creating an unbaked bagel that is shelf-stable. The cooking time of the bagel must be carefully monitored to avoid under cooking while ensuring a fully cooked product.

Once the bagels are boiled, they are dried and packaged for distribution. Prior to consumption, the bagels are browned in a hot oven. Freezing gives the bagels a shelf life of up to about 9 months, air tight packaging a shelf life of up to about 10 days and gas flush packaging has a shelf life of about 45 days. Once the bagels are baked, they remain fresh for up to 48 hours.

BRIEF DESCRIPTION OF THE DRAWINGS

The advantages of the instant disclosure will become more apparent when read with the specification and the drawings, wherein.

DETAILED DESCRIPTION OF THE INVENTION

Figure 1:
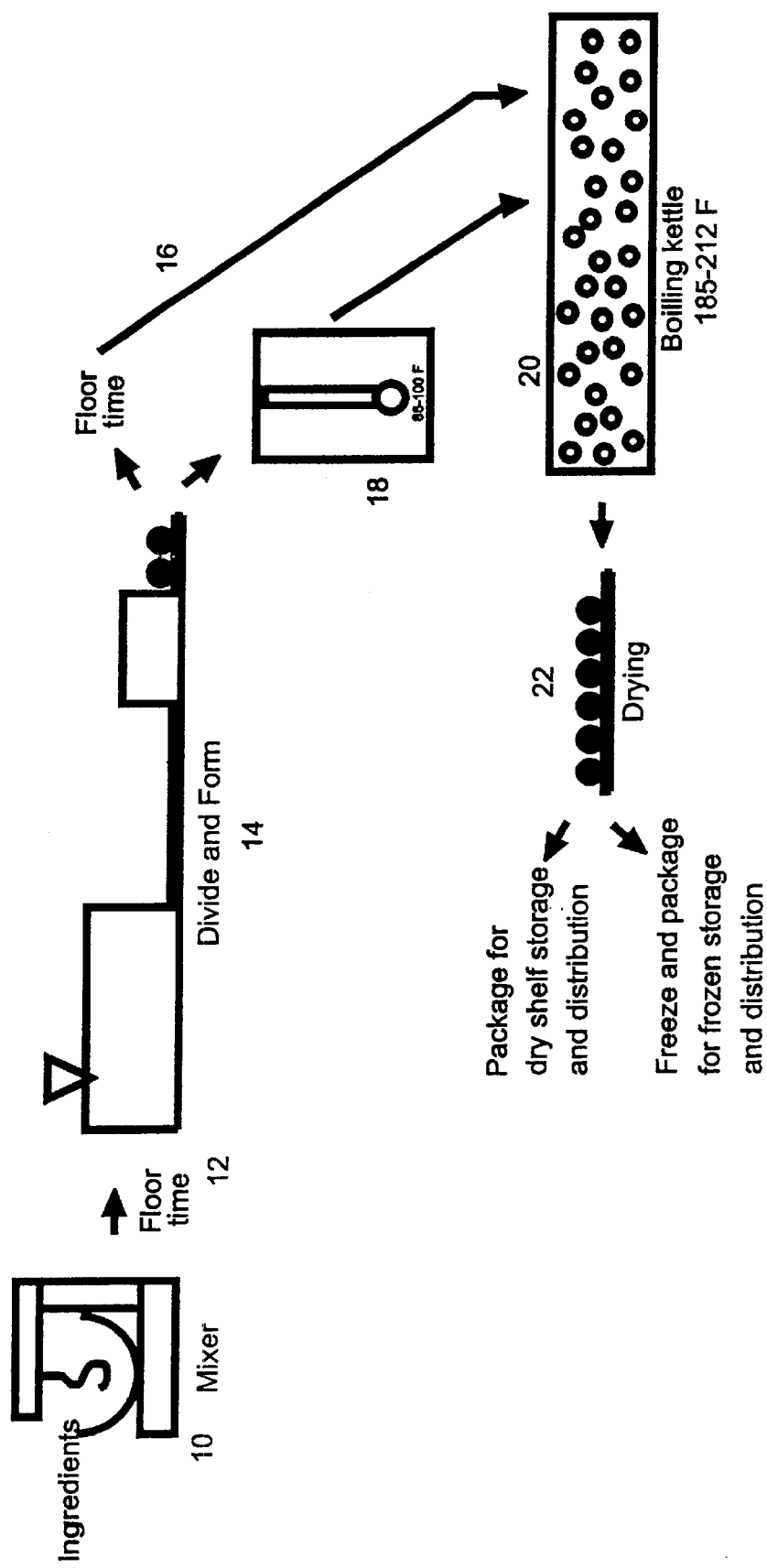
FIG. 1 is a plan of the mixing, cooking and storing process of the disclosed method.

The present invention provides a means of manufacturing bread products, such as bagels, which when baked have the characteristics of fresh baked goods. The bread products cooked through boiling, and subsequently baked, produce a product superior to that of previous, time-saving bread, and in particular bagel, processes. Although the process described herein is for bagels, other bread products can be substituted. Any bread product, such as crusty French bread, chibattas, bread sticks, hard rolls, sour dough rolls, etc., prepared by the disclosed method has an improved texture and shelf-life over frozen or par baked products. The process products a bread product that closely replicates a product produced from scratch. The process can be used by consumers for convenient bake-at-home use and by food-service and bakery retailers for trouble-free baking on demand. The process, without the use of oxidizers or additives, dough conditioners or stabilizers, produces a shelf-stable bagel that can be stored, prior to baking, for up to 10 days on the dry pantry shell and when frozen, have an extended shelf-life of 6–9 months. The necessity for temperature controlled storage during distribution of the unbaked product is eliminated, as well as the need for proofing just prior to baking and expensive, specialized steam injected ovens. Once the bagels are baked in a conventional or convection oven, they have the same characteristics as freshly prepared, boiled bagels with a superior crispy crust and a moist, chewy texture. Even after baking, the disclosed process produces a bagel with an extended shelf life of up to 48-hours without controlled storage. This storage time is previously unheard of in the bagel industry and eight times longer than the prior art Petrofsky et al process. This 48-hour shelf life has not been attained either by previous attempts of the partially baked and then frozen bagel products or of the unbaked, raw dough frozen products currently available.

The following definitions, commonly used within the art, are used within this disclosure:

Floor time is the term used to describe a relatively inactive state in the process, such as a wait time prior to the beginning of the next process step or where the dough is relaxing or resting.

Rest is the state when a yeast-risen dough is permitted to undergo fermentation proofing) without process control.

Proofing is the time when a yeast-risen dough is permitted to undergo fermentation, usually by use of process controls, such as temperature and humidity.

Unlike prior art methods, the disclosed process first completes the yeast activity within the bagel. The product is then fully cooked in hot water. By fully cooking the dough in the hot water bath, moisture is added to the product rather than drawn from it, resulting in a finished bagel with a moist chewy texture that remains fresh for a longer period. Problems occur when the crust of a bread product is much lower in moisture than the interior of the product. To equalize, water migrates from the crumb to the crust, resulting in a toughening of the crust and a drying of the crumb.

Because the disclosed process results in a bagel not only with a higher moisture content in its interior structure but a higher moisture content in its crust, or skin, this migration does not occur as rapidly. Consequently, if a manufacturer were to choose to freeze this bagel in its boiled, but unbaked state, freezing will not significantly dry the product. Additionally, a bagel prepared according to the disclosed process does not require special thawing and proofing before being baked from a frozen state.

The disclosed bagels, when frozen, can be placed directly on the rack of a home or commercial oven, conventional or convection, hearth or revolving, and baked at, for example, 350° F.–400° F. for 17–25 minutes. As the bread product is fully cooked at the time of baking, the baking process serves as a browning process. Therefore, increasing the oven temperature will reduce the cooking time and the time should be adjusted according to the temperature of the oven. As an alternative, the bagels prepared by the disclosed process can be partially baked at the place of manufacture, with the final cooking being accomplished at home or store.

The disclosed process provides the unique storage capabilities because the bagel, or other bread product, is fully cooked before shipping. The process of boiling the bagel for a sufficient time allows the bagel to cook fully, thereby reducing the starch content. As starch feeds the yeast, cooking reduces the "food supply" for the yeast, ending the process. In the prior art processes, in which the bagel is partially cooked, freezing is used to stop the yeast process.

Starches, commonly referred to as simple and complex carbohydrates, are a mixture of linear and branched polymers of D-glucose, amylose and amylopectin, which become closely associated through hydrogen bonding. D-glucose is the basic building block of starch. The structure of amylose molecules is helical, due to the nature of the tetrahedral carbon atom and the alpha-1,4 linkage, with one turn of the helix occurring every 6 glucose units. Depending on the amylose source, it is made up of 200–2000 glucose units. These simple carbohydrates are usually rapidly absorbed and utilized by the body. The tendency for amylose to retrograde is strong. In contrast, amylopectin molecules are branched polymers, containing 10,000–100,000 glucose units, connected at branch points by alpha-1,6 linkages.

These complex carbohydrates are insoluble because of their complex nature and because of the complexity of their linkages, very little helical structure is formed. The lack of helical structure due to the branched amylopectin, inhibits close association of linear parts in the molecules, lessening the opportunity or tendency for amylopectin to retrograde. Wheat flours contain approximately 25 percent amylose and 75 percent amylopectin. Unique to this process is the interaction between carbohydrates (i.e., starches) as it relates the grain-based complex to staleness and health benefits.

Bread staleness (the undesirable changes that take place between the time bread is baked and consumed) is caused by crumb firming and moisture changes. Crumb firming is caused b changes in starch structure. During baking the starch granules swell and the linear chains (amylose) diffuse out and as the bread cools, the straight chains link together to provide the loafs initial strength and shape. The branched chains (amylopectin) remain in the granules during baking and link together slowly during storage to make the crumb firmer with time. Moisture changes occur through evaporation and water redistribution. The starch absorbs moisture, resulting in a migration from the protein to the starch, leading to increased rigidity of the gluten network. Structure of Starch in Food: Interaction of Starch and Sugars with Other Food Components, P. Wrsch. Prior art methods to curb staleness include the addition of fat, surfactants, sweeteners, enzymes and/or regulation of storage temperature. The addition of fat to the formula results in a bread product that stays soft and more palatable for a longer period. Surfactants, (alpha-onoglycerides) or dough strengtheners (emulsifiers) such as diacetyl tartaric acid esters of mono- and diglycerides (DATEM), sodium stearoyl lactylate (SSL), polysorbate 60, and ethoxylated monoglycerides (EMG), can also be added to prevent staleness. Principals of Cereal Science and Technology, R. Carl Hoseney. The addition of sweeteners slows staleness directly by retaining moisture within the sweetener and hence the bread product. Reduction of storage temperatures, where the optimum temperature is 70° F. to 95° F., also reduces staleness. Freezing at 0 to −20° F. has the effect of one day's storage time, but then stops all aspects of staleness until defrosting. The crumb firming effects of staleness can be reversed by briefly heating the bread product to 120° F. or more, but is progressively less effective with each heating. Enzymes (alpha-amylases) are added as anti-staleness agents as they slow the rate of crumb firming in a way that also slows the rate of moisture migration. Enzymes break down a portion of the starch during processing and baking, limiting the firmness created by the starch when linked together during storage.

Rapidly digested carbohydrates (linear strands of glucose molecules or amylose) break down quickly during digestion and can raise blood glucose to dangerous levels. The glucose molecules are: 1) used by the cells for energy, 2) stored as glycogen in the liver and muscle tissue, and 3) stored as fat. Foods that create this rapid increase in blood glucose are known as having a high glycemic index. The Glycemic Index is a ranking of foods based on their immediate effect on blood glucose levels The G.I. Factor: The Glycemic Index Solution, Dr. Jennie Brand Miller and Dr. Stephen Colagiuri, April 1996. Foods are ranked in based on their affect on blood sugar levels two or three hour after consumption. The ingestion of grain-based bread products is necessary for the system in obtaining fiber and protein. Unfortunately, in the past, these grain-based bread products also carry with them the glucose-based linear starch molecules that are known to encourage weight gain. Slowly digested or insoluble amylopectin (branched glucose molecules) break down slowly, releasing glucose gradually into the blood stream, resulting in a lower glycemic index. Additionally, slowly digested, insoluble carbohydrates (amylopectin) can decrease the chance of excessive fat storage. Unique to this process is the way in which staleness, weight gain, and glycemic index levels are decreased by altering of the starch structures during the process of the method described herein.

In the process of cooking the bread product sufficiently to become edible, the bagel or bread product is boiled until the yeast action is completed. During the process the starch granules swell, the linear chains (amylose) diffuse out, and the straight starch chains link together to provide the initial strength and shape of the bread product. The product takes on added health benefits beyond the commercial benefits of a longer shelf life.

When starch is heated in aqueous solution, it undergoes a series of changes known as gelatinization and pasting. When the bread product is introduced into the boiling water bath, the resulting swelling and gelatinization patterns of the various types of starch granules involve:

1) swelling begins in the least organized amorphous intercrystallite regions of the starch granule;
2) this swelling creates a tension on neighboring crystallites and tends to distort them,
3) further heating leads to uncoiling or dissociation of double helical regions and break-up of amylopectin crystallite structure;
4) the liberated side chains of amylopectin become hydrated and swell laterally, further disrupting crystallite structure;
5) increased molecular mobility with further hydration permits a redistribution of molecules and the smaller, linear amylose molecules diffuse out. (French, 1984)

It has been observed that crystalline structure loss and swelling occurs simultaneously in a fast process and a slow process. (Marchant and Blanshard, 1980 and 1978) The fast process is identified as the melting of the crystallites and results from a reaction to a rise in temperature, where the low-molecular weight linear amylose is leached out at low temperatures −60° C. to 70° C. (Leach, et. al., 1959) The slower reaction is a disentangling of the chains and some swelling of the starch granule. This reaction occurs at temperatures of 80° C. to 90° C. and involves the stronger, or less readily accessible, bonds in the branched, higher-molecular weight amylopectin. After the period of heating in the boiling water bath, the solubilized amylose is separated from the granule residue and the now broken chains of the branched amylopectin are leached out and diffused. As heating and swelling continue, hydrated starch molecules diffuse (are leached) from the intricate organization of the granule into the surrounding medium. (Leach, et. al 1959) The temperatures characterizing the changes in the wheat starch were noted at 54° C. (129° F.) at the onset, 69° C. (156° F.) at the peak, and 86° C. (187° F.) at the conclusion. (Stevens and Elton, 1971) It is further noted that the percent aqueous suspension of wheat starch, where the suspensions were 26% and 67% water, affected the temperature at which gelatinization was complete. As the water content decreased, the temperature necessary to complete gelatinization increased. This is important as prior art bagels are noted to have the wheat starch in an aqueous suspension of 52% or less. Conversely, the bagels in accordance with the disclosed process, suspend the wheat starch in a 60–68.5% moisture medium. Also noted here is the inability of the prior art to diffuse the starch in shorter boiling times, as the internal temperature of the wheat starch in its medium must exceed 149° F. Below this temperature the starch granules will not start to swell and begin the process of diffusion.

The mixing to storage process is illustrated in FIG. 1. Though not critical to the invention, an example of the bagel dough ingredients is set forth below. Those in the baking art will be aware of alternate ingredients and quantities.

| Ingredient | lbs. |
| --- | --- |
| Flour | 100.00 |
| Sugar | 5.28 |
| Salt | 2.08 |
| Yeast | 1.39 |
| Water | 60–68.5 |

The flour can be conventional unbleached baker's flour or the texture of the finished product can be slightly adjusted by selecting flour based on gluten content. A higher level of gluten in the flour will result in a chewier crust and product.

The sugar level is determined by taste and is used to feed the yeast so that the dough will rise; honey makes an acceptable natural substitute. Salt will also vary with taste, but is used to inhibit or regulate the growth of the yeast and together with the sugar keeps the yeast growth in controlled balance. The amount of yeast stated above is for an instant yeast, however, compressed or active-dry can be used in the manufacturers recommended ratios for substitution. Water is from a good quality, readily available source. Temperature of the ingredient water is of the range 16° C.–27° C. dependent upon the percent relative humidity (% RH) in the manufacturing mixing area.

Figure 2:
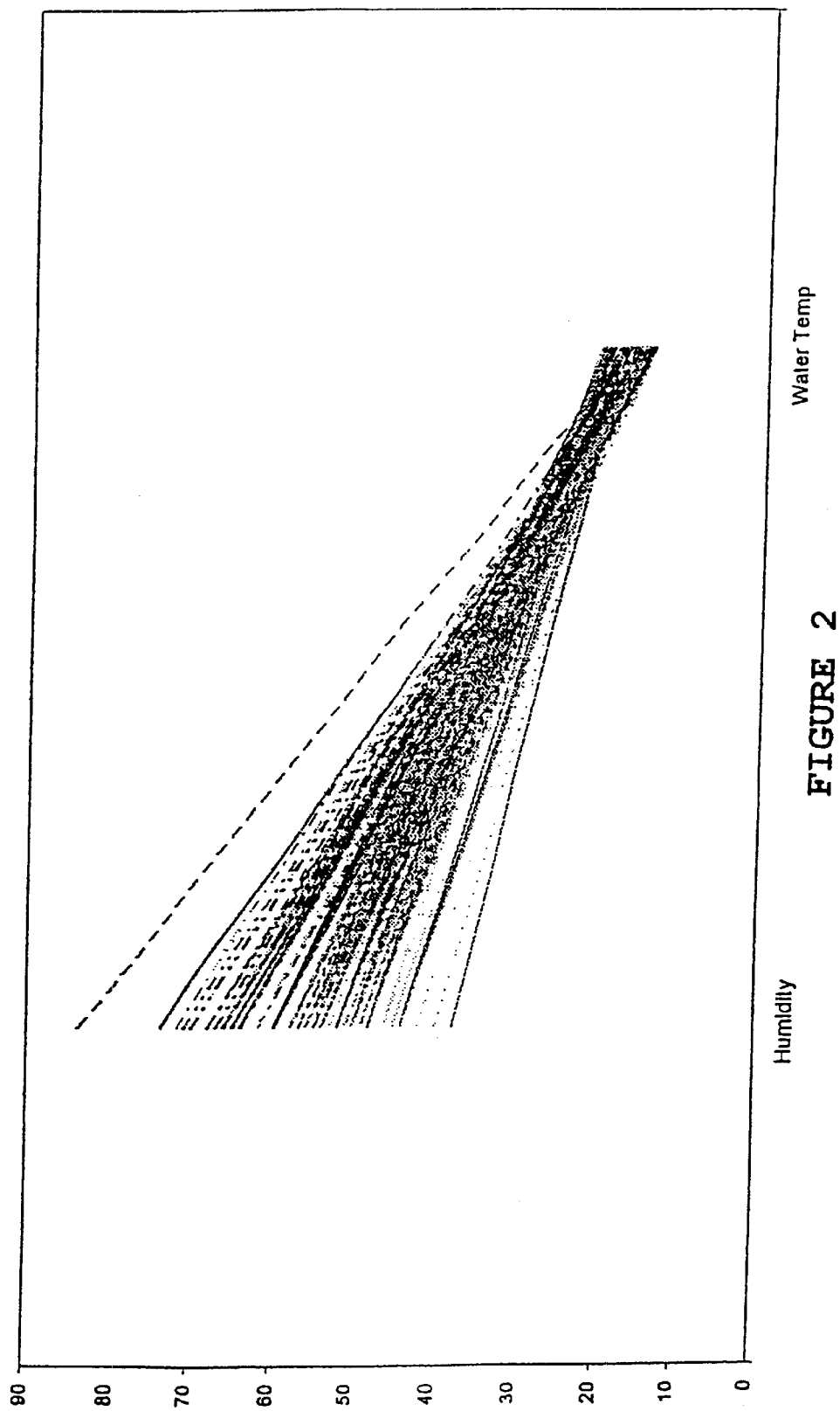
FIG. 2 is a graph depicting the relationship between humidity and water temperature.

As seen in the graph of FIG. 2, a higher % RH requires a lower temperature water and a lower % RH a higher temperature water. The ratio between water temperature and humidity is an important element in all bread making, as dough prepared in an environment of low humidity will tend to expel moisture into the atmosphere. This loss of moisture makes the dough dry and cool. A higher temperature water in the mixture creates a warmer dough, allowing for greater adsorption of moisture into the flour, thereby compensating for the moisture transfer from the dough to the atmosphere. Conversely, dough prepared in a high humidity atmosphere will take on moisture resulting in a wetter, warmer dough. A lower temperature water in the mixture creates a cooler dough, allowing for greater adsorption of moisture from the atmosphere.

The disclosed method allows the dough to be mixed without additives such as citric acid, enzymes, or alcohol that are generally required to preserve the yeast in the frozen state and help to restore its activity when thawed. As seen in FIG. 1, the dough is processed, in step 10, in a horizontal dough mixer or a planetary mixer with a dough hook, for approximately 12 minutes, to generate a dough temperature of 74° F.–80° F. It should be noted that the process time is affected by the water temperature and humidity and the temperature of the dough is a more accurate guide than actual time. The resulting dough can be given floor time, in step 12, for 10–20 minutes and then divided and formed, step 14, into 4–4½ ounce bagel shapes. The bagel shapes are allowed to rest, step 16, until light enough to float in the water bath. Though it is not necessary, a temperature and humidity controlled proof box 18 can be used, with the temperature set to 85° F.–100° F. and the relative humidity to 30–50%, for approximately 15–40 minutes. In either method, this proofing creates a bagel that floats in water rather than sinks to the bottom of the kettle and facilitates thorough cooking during the boiling process. The proofing time must be monitored as too little proofing time and the bagel will not cook completely as the yeast is not fully activated. Too much proofing, however, activates the yeast too soon and the bagel falls immediately following boiling. Due to the unique process of completely cooking the bagel in the boiling water, baking will restore the fallen bagel to about 85% to 95% of its desired volume.

Both the rates for proofing and cooking are determined by the rate of heat penetration into the dough. Increasing the proofing or boiling temperature provides a larger gradient of temperature but that only speeds the rate of penetration slightly. The internal temperature cannot exceed the temperature of either the water bath or the proofing environment and is related to the distance of the interior of the product from the outer temperature.

Bagels are transported to the water bath 20, which is maintained at a temperature of 180° F.–21 2° F., inserted topside down. They are immediately flipped to cook the bottom-side for 3–5 minutes, then flipped over and left to cook the topside for an additional 3–5 minutes. In order to seal the raw dough, it is desirable to coat the entire product with hot water at the initial insertion into the boiling water bath. This sealing of the raw dough sets the crust and limits the escape of the gases from the product, retaining the product's ability to rise and retain its lift and volume. Cooking time is determined by the weight of the bagel and a total time of about 1½ to about 2¾ minutes is required for approximately each one (1) ounce of bagel dough.

Insertion of the bagel topside down into the water bath can be altered by inserting the bagels bottom side down and immediately spraying the topside to coat the entire bagel wit hot water. This method is especially important in some automated manufacturing lines Where conveyor-boiling systems are utilized, but automated flip wheels are limited.

Once fully cooked, the bagel is then flipped, if necessary to place the top up, and removed from the water bath to a rack or screen to dry and cool as in step 22. Although it is not necessary for completion of the process, the placement of the top up for the cooling process results in an aesthetically more appealing product. The resulting product will be a bagel that is unbaked, but fully cooked, with the yeast activity having completed its cycle.

Because the bagels are shelf-stable and the yeast has been put through its complete cycle, the unbaked bagel product can, at this stage, be pre-sliced, resulting in a bagel that, when baked, can be popped apart. If desired, toppings can be added to the bagels.

The cooled bagels are then: a) packaged in appropriate pack aging for storage and distributed for placement on a dry ambient temperature shelf, step 24, or b) packaged and either refrigerated or frozen, step 26, for storage and distribution in a temperature controlled environment. Bagels packaged in a protective packaging and placed on the shelf will have a shelf-life of ten (10) days. The use of nitrogen flush (gas flush) packaging increases to ambient temperature storage and shelf life up to 45 days. Bagels placed under refrigeration will have a shelf-life of 21 days. If the bagels are frozen under a constant temperature of 0 to –10° F., they can be maintained for 6–9 months.

The disclosed process results in a bread product, such as bagels, that have the following benefits:

are fully cooked at the rate of approximately 1½ to 3¼ minutes per one (1) ounce bagel dough;

are shelf-stable before baking;

are a consistent product even when baked under varying conditions;

absorb and retain more moisture during the initial cooking process, thereby inhibiting staleness;

yield a baked product with a longer shelf-life (up to 48 hours);

can be produced without need for additives such as citric acid, enzymes, gelatins, or alcohol, resulting in the ability to produce "clean" labels;

can be fresh baked without the need for commercial steam ovens, proof boxes, or washes;

can be baked in residential ovens (conventional, convection, or counter-top toaster ovens) for bake and serve at home markets;

do not require specific temperatures for baking and can vary between 350° F. and 450° F.; as frozen bagels do not require thawing before baking, frozen or unfrozen unbaked product can be placed directly in a hot oven;

yields a product with an extended, unbaked shelf-life in unfrozen or frozen state;

yields an unbaked bagel that can be stored and shipped at ambient temperatures.

Since other modifications and changes varied to fit particular operating requirements and environments will be apparent to those skilled in the art, the invention is not considered limited to the example chosen for the purposes of disclosure, and covers all changes and modifications which do not constitute departures from the true spirit and scope of this invention.

What is claimed is:

1. A method of increasing shelf-stability of unbaked bread products comprising proofing bread dough containing yeast for a period of time sufficient to complete all yeast activity within said dough during said proofing and then fully cooking the resulting dough in boiling water for about 1½ to 3¼ minutes per ounce of dough before packaging for distribution, thereby linking starch chains together within the bread dough to provide the initial strength and shape of said bread products.

2. The method of claim 1 wherein said bread product is a bagel.

3. The method of claim 1 wherein said boiling water has a temperature in the range of about 180° F.–212° F.

4. The method of claim 3 wherein the dough of said bagel is sealed by immersion into said boiling water, thereby setting a crust, limiting the escape of gases and adding moisture to the crust.

5. The method of claim 3 wherein the dough of said bagel is sealed by spraying said dough with said boiling water, thereby setting a crust, limiting the escape of gases and adding moisture to the crust.

6. The method of claim 1 wherein said bread product is browned in an oven after distribution.

7. A method of increasing shelf-stability of an unbaked bagel comprising proof bagel dough containing yeast for a period of time sufficient to complete all yeast activity within said dough and then fully cooking said bagel dough in boiling water having a temperature in the range of about 180° F.–212° F. for about 1½ to 3¼ minutes per ounce of dough, packaging said cooked bagel dough for distribution, and browning said bagel dough in an oven after distribution.

8. The method of claim 7 wherein the dough of said bagel is sealed by immersion into said boiling water, thereby setting a crust, increasing moisture and limiting the escape of gases.

9. The method of claim 7 wherein the dough of said bagel is sealed by spraying said bagel dough with said boiling water, thereby setting a crust, increasing moisture and limiting the escape of gases.

10. The method of preparing a bagel leaving an increased shelf-stability for distribution comprising the steps of:

a. combining ingredients to make said bagel;

b. mixing said ingredients to form a dough containing yeast;

c. providing a first floor time for said dough;

d. dividing and forming said dough into a bagel;

e. providing a second floor time for said bagel dough, said second floor time being sufficient to complete all yeast activity within said dough and enable said bagel to float within water;

f. calculating the total cooking time for said bagel dough by multiplying said bagel dough's weight by about 1½ to 3¼ minutes per ounce of dough, g. exposing a first side of said bagel dough to boiling water for a time about equal to one half of total cooking time;

h. exposing a second side of said bagel dough to boiling water for a time about equal to one half of the total cooking time to prepare a cooked begal;

i. drying said cooked bagel;

j. packaging said dried bagel for distribution;

k. distributing said packaged bagel;

l. removing said bagel from said packaging; and m. baking said bagel to brown said bagel.

11. The method of claim 10 wherein said first floor time is in the range of about 10–20 minutes.

12. The method of claim 10 wherein said second floor time is for about 15 to 40 minutes.

13. The method of claim 12 wherein said dough is placed in a proof box during said second floor time, said proof box having a temperature in the range of about 85° F. to about 100° F. at a relative humidity of about 30–50%.

14. The method of claim 10 wherein said dough is packaged for distribution by freezing, thereby enabling said dough to have a shelf life of up to about 9 months.

15. The method of claim 10 wherein said dough is packaged for distribution by air tight packaging, thereby enabling said dough to have a shelf life of up to about 10 days.

16. The method of claim 10 wherein said dough is packaged for distribution by gas flush packaging, thereby enabling said dough to have a shelf life of up to about 45 days.

* * * * *